Nov. 4, 1969  H. FELDHOFF ET AL  3,476,963
MULTIPART CASING FOR AN ELECTRICAL MACHINE
Filed Jan. 31, 1967  4 Sheets-Sheet 1

INVENTORS:
HEINRICH FELDHOFF
KLAUS BECKER
GEORG SCHLERETH
BY Marzall, Johnston
Cook & Root
ATT'YS INVENTORS:
HEINRICH FELDHOFF
KLAUS BECKER
GEORG SCHLERETH
BY
*Marzall, Johnston, Cook & Root*
ATT'YS INVENTORS:
HEINRICH FELDHOFF
KLAUS BECKER
GEORG SCHLERETH
BY
Marzall, Johnston
Cook & Root
ATT'YS Nov. 4, 1969  H. FELDHOFF ET AL  3,476,963
MULTIPART CASING FOR AN ELECTRICAL MACHINE
Filed Jan. 31, 1967  4 Sheets-Sheet 4
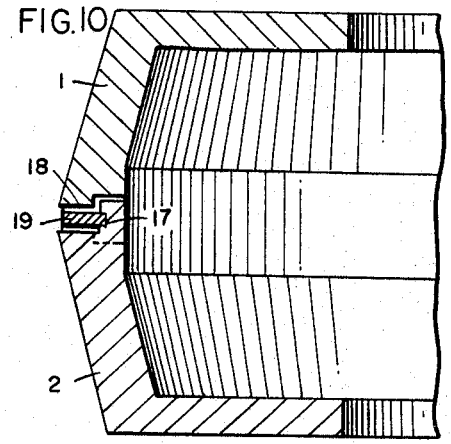
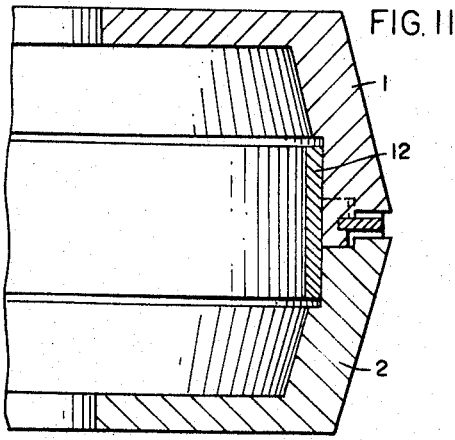
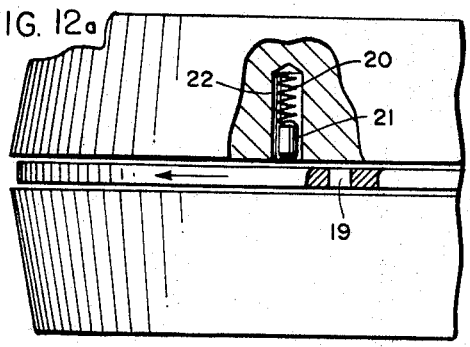
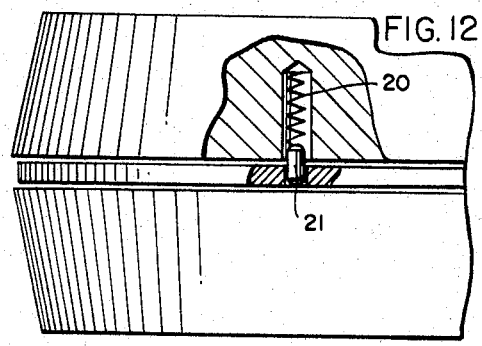
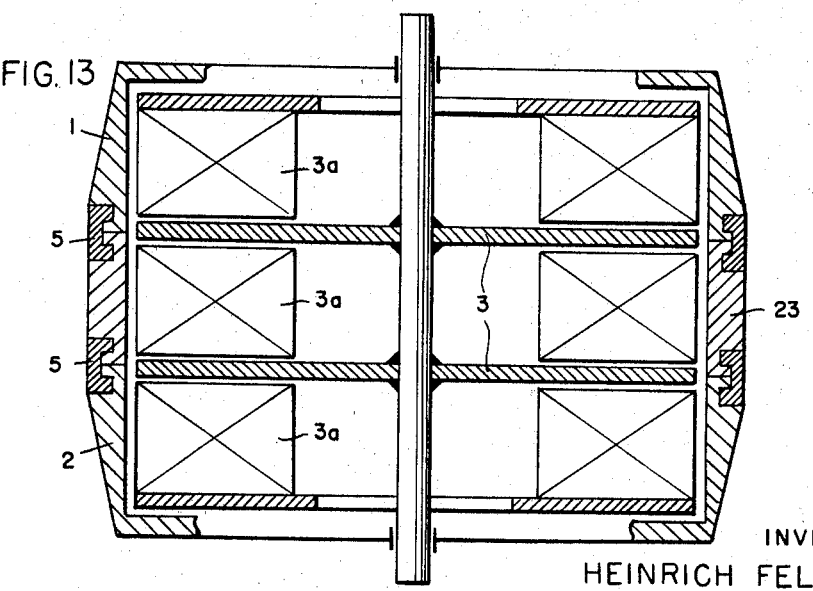
INVENTORS:
HEINRICH FELDHOFF
KLAUS BECKER
GEORG SCHLERETH
BY
Marzall, Johnston, Cook & Root
ATT'YS

# United States Patent Office 3,476,963
Patented Nov. 4, 1969

3,476,963
MULTIPART CASING FOR AN
ELECTRICAL MACHINE
Heinrich Feldhoff, Bad Duerkheim, Klaus Becker, Ludwigshafen (Rhine), and Georg Schlereth, Limburgerhof, Pfalz, Germany, assignors to Badische Anilin- & Soda-Fabrik Aktiengesellschaft, Ludwigshafen (Rhine), Rheinland-Pfalz, Germany
Filed Jan. 31, 1967, Ser. No. 612,953
Claims priority, application Germany, Feb. 3, 1966, B 85,643
Int. Cl. H02k 5/04
U.S. Cl. 310—89                    9 Claims

ABSTRACT OF THE DISCLOSURE

A new multipart flangeless casing for electrical machines in which two adjacent parts of the casing are urged together by magnetic forces generated by active components of the machine. The parts of the casing are provided in the region of their contacting surfaces with intermittent projections and peripheral grooves in these projections. Two adjacent casing parts are locked together by means of an appropriately shaped ring which is inserted into the grooves. In explosion-proof embodiments there is provided in the interior of the casing an additional detachable ring whose width establishes the gap width at the joint of the parts.

---

Figure 1:
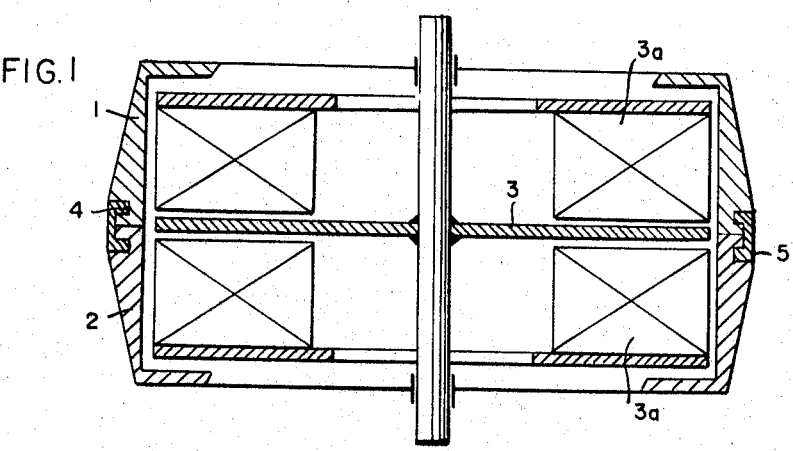

This invention relates generally to casings of electrical machines and more particularly to multipart casings of electrical machines with an axial gap or of the disc armature type in which the parts of the casing are urged together by magnetic forces generated by the active components of the machine.

In electrical machines of conventional design which have a radial gap between the stator and the rotor the casing is formed by bolting the bearing plates to the laminations of the stator or to the outer shell. In fractional horse-power motors the casing is frequently formed by the dished conformation of one or both bearing plates which are bolted together.

In a disc armature machine the flat disc-shaped rotor is located in the axial air gap between the annuli of poles of the stator. In a conventional design the annulus of stator poles usually formed by permanent magnets is attached either directly to the bearing plate or to a special ring forming a return path for the magnetic flux. In this case, the casing is composed as in other motors by the bearing plates and a cylindrical outer shell. In such disc armature machines the normal magnetic forces of the permanent magnets are usually sufficient to hold the parts of the casing firmly together. In other designs of such machines bolts are additionally used which mechanically lock the flanged parts of the casing together.

If it is desired to provide a disc armature type machine with a pressure-tight casing to make it explosion-proof, then the forces generated by the magnets are insufficient for withstanding the possible explosive pressure which urges the parts of the casing apart. Occasions also arise in which the casing is subject to axial loads. In such a case, too, the magnetic forces are inadequate to ensure the maintenance of a reliable connection between the parts of the casing. Another problem arises when two or more disc armature machines are to be combined in cascade. A bolted connection between the flanged parts of the casing would necessitate a large number of relatively large bolts, tiebolts or the like, and the overall diameter of the machine would be substantially, and hence most undesirably, enlarged.

It is an object of the present invention to provide an additional and reliable mechanical connection between the parts of the casing without the use of flanges. This connection is so contrived that it will be explosion-proof without substantial modification of the parts, possibly merely by the addition of some further elements. The said and other objects are achieved by using a multipart casing for an electrical machine in which two adjacent parts of the casing are urged together by magnetic forces generated by active components of the machine, wherein each of said parts of the casing are provided in the region of their contacting surfaces with intermittent projections and peripheral grooves in these projections which grooves are parallel to the contacting surfaces and into which a correspondingly shaped ring is insertable for mechanically holding the parts together. The parts of the casing are advantageously identical in shape.

According to another feature of the invention there is releasably inserted in the parting plane inside the parts of the casing, which are to be mechanically held or locked together by the locking ring, an additional ring which establishes the required gap lengths at the parting plane of an explosion-proof casing.

Although the proposed construction of the casing corresponds to the cup-shaped type of casing conventionally used for electrical machines it differs therefrom essentially in that the parts of the casing are mechanically locked together without bolts or screw means. The casing halves are first pressed together in the usual way by the magnetic forces. The supplementary mechanical lock between the parts of the casing, as proposed by the present invention, need be designed only to withstand that part of any opposing force which exceeds the magnetically generated holding forces.

The invention will be hereinafter described in greater detail by reference to the accompanying drawings which diagrammatically illustrate multipart casings according to the invention for electric motors of the disc armature type.

Figure 2:
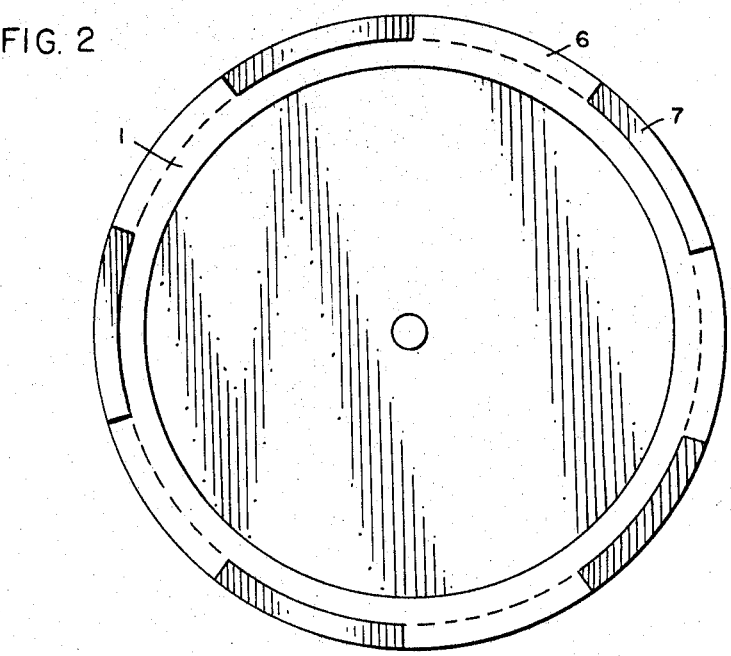
Figure 3:
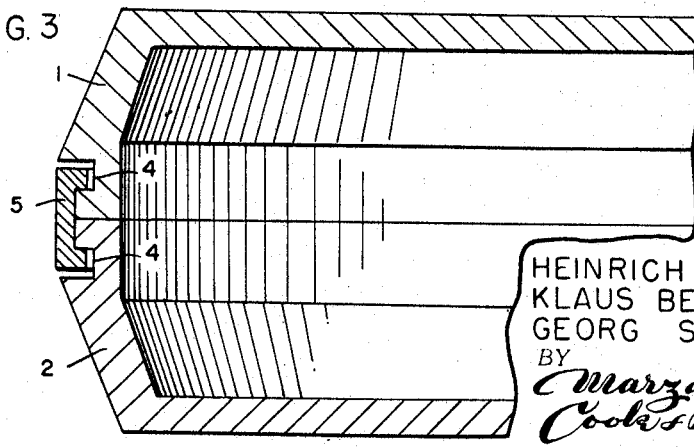
Figure 4A:
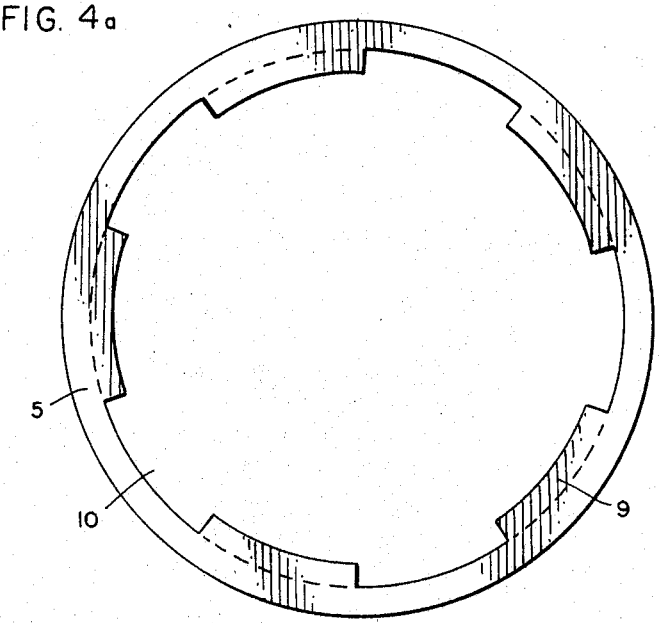
Figure 4B:
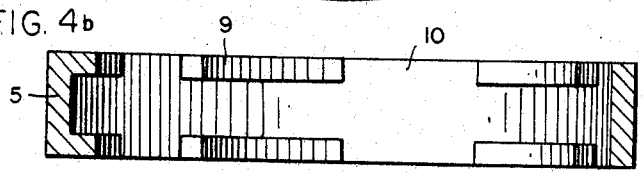
Figure 5:
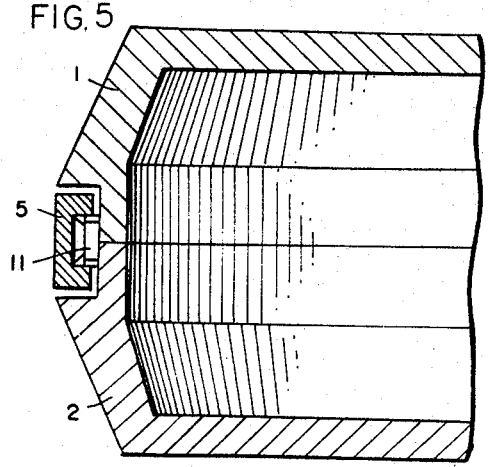
Figure 6:
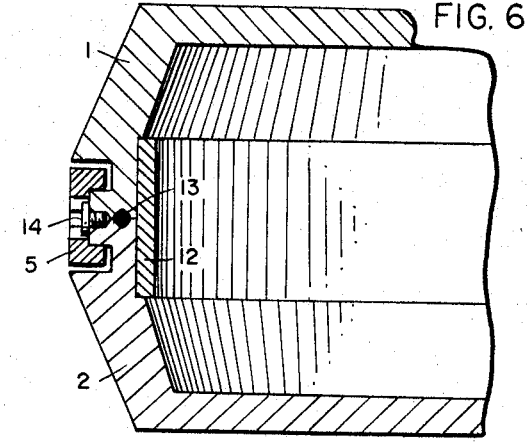
Figure 7:
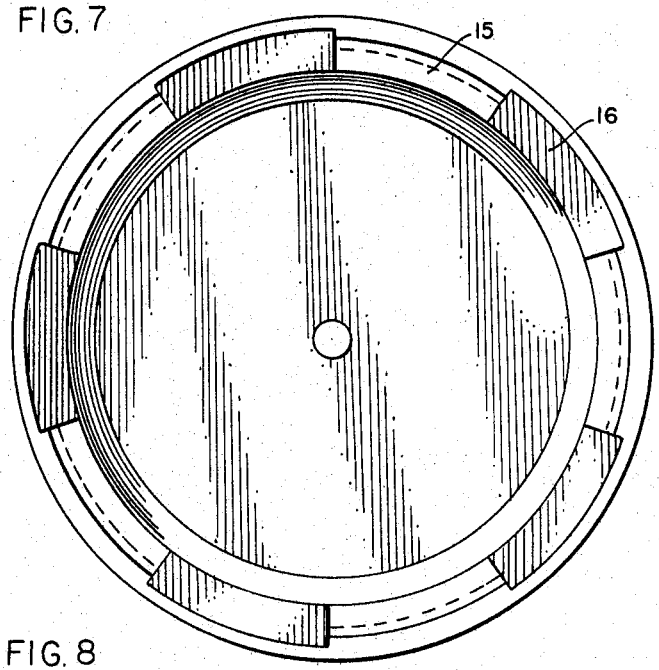
Figure 8:
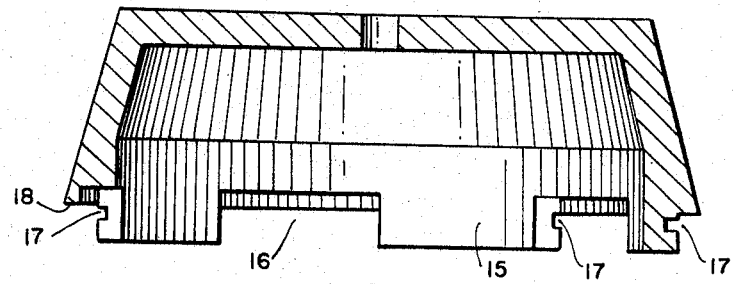
Figure 9:
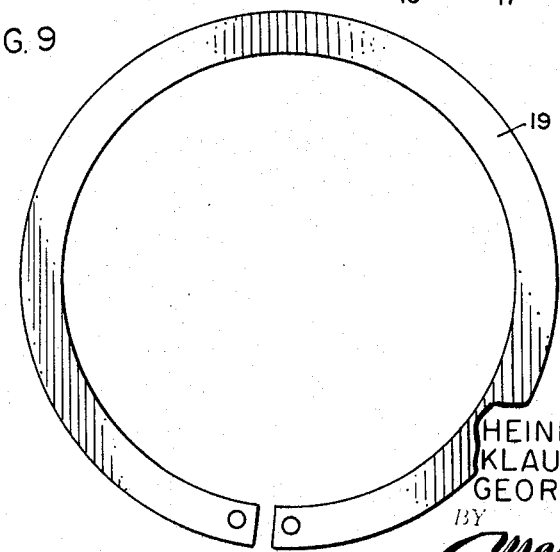

In the drawings:

FIG. 1 is an axial section of a motor,
FIG. 2 is a plan view of one half of the casing,
FIG. 3 is a section of the two halves of the casing after these have been mechanically locked together,
FIGS. 4a and 4b are a plan view and axial section respectively of a locking ring,
FIG. 5 is a section corresponding to that in FIG. 3 of an arrangement comprising a dowel in the joint,
FIG. 6 is a section corresponding to that in FIG. 3 including an inserted ring for an explosion-proof design,
FIG. 7 is a plan view of a different embodiment of one half of a casing,
FIG. 8 is an axial section of one half of a casing according to FIG. 7,
FIG. 9 is a plan view of the locking ring for the embodiment according to FIG. 7,
FIG. 10 is a section of two casing halves according to FIGS. 7, 8 and 9, locked toegther,
FIG. 11 is a section corresponding to that in FIG. 10 including an inserted ring for an explosion-proof design,
FIGS. 12a and b illustrate the holding in position of a locking ring by means of a pin, in section, and
FIG. 13 is a section of disc armature machines combined in cascade.

With reference to FIGURE 1 the active components of an axial gap motor, namely a disc armature 3 and two annuli 3a of stator poles, are symmetrically disposed inside a casing comprising two parts 1 and 2.

Preferably the casing is formed by two identical and interchangeable cup-shaped parts so that the joint between the two parts 1 and 2 will be located exactly in the radial centre plane of the armature disc 3.

As illustrated in FIGS. 1 and 3 each half 1 and 2 of the casing is provided with a peripheral groove 4 near the parting plane or joint. The base of each groove 4 undercuts the maximum diameter edge of the cup-shaped half of the casing. When the two halves 1 and 2 have been placed together they are mechanically locked by sliding a suitably sectioned locking element 5 over the two grooves 4 without thereby increasing the overall diameter of the casing. In order to permit this to be done the locking element 5 may consist of several separate parts or it may have the form of a ring provided with intermittent fins and generally having a U-shaped cross section.

For the insertion of a one-piece locking ring regularly spaced arcuate portions of the land 6 that remains between the groove 4 and the parting face of each half 1 and 2 of the casing are removed, so that in plan, as illustrated in FIG. 2, recesses 7 will appear in the peripheral land 6 of each casing half. When the two casing halves are placed together the remaining portions 6 of the peripheral lands are positioned so that they register, and the recesses 7 will then likewise be in register. The corresponding one-piece locking ring 5 illustrated in FIGS. 4a and 4b preferably has a U-shaped cross section. In order to permit the locking ring to be fitted in the parting plane of the two casing halves arcuate sections are cut out of the two rims of the U-section of a peripheral length corresponding to the remaining lengths of the lands 6 on the cooperating halves 1 and 2 of the casing. Fins 9 separated by gaps 10 are thus formed. However, the fin segments 9 must be peripherally slightly shorter than the peripheral lengths of the corresponding recesses 7 in the casing halves to permit the locking ring to be pushed over the casing halves 1 and 2. The arcuate land segments 6 of the casing halves are placed in register when the two casing halves are fitted together and the halves can then be locked by rotating the locking ring 5. For locking the casing the arcuate land portions 6 on the casing halves 1 and 2 and/or the fin segments of the locking ring 5 may be formed with rising surfaces to produce a wedge action. When the casing is locked all the fin segments 9 of the ring 5 will have been received into the undercut grooves 4 in the casing halves (FIG. 5). The casing halves may be prevented by two or more locating pins 11, as illustrated in FIG. 5, from rotating out of the position in which their land segments 6 are in register. A moisture- and or dust-tight joint between the casing halves, which may occasionally be required and which will satisfy more stringent requirements, can be created in conventional manner by the insertion of a seal 13, preferably an O-ring seal, which is received into grooves machined into the parting faces of the casing halves. The mechanically locked conection between the two casing halves 1 and 2 assures that the air gap in the machine is precisely adjusted and this will not be affected by the provision of the elastic seal 13.

In an explosion-proof embodiment of the mechanically locked casing, as above described, the invention proposes to insert, symmetrically with respect to the parting plane on the inside of the two casing halves 1 and 2, an additional ring 12 located in a turned-out recess in each of the casing halves. Preferably the detachable ring 12 is of cylindrical shape. Its axial dimension, i.e. its width, will be determined by the regulations governing explosion protection with due reference to the necessary gap widths. The ring 12 simultaneously serves as a centering element so that a single dowel 11 will be sufficient to prevent relative rotation between the two casing halves 1 and 2. Regulations relating to explosion protection require that the elements which provide such protection should be releasable only with a special tool. This requirement can be met for instance by providing one or more special screws 14 which comply with these regulations and by screwing these, after the halves of the casing have been locked, through the locking ring 5 into the casing wall. These screws will then prevent the locking ring 12 from being removed with a standard tool.

Alternative structural arrangements can be devised within the scope of the present invention for mechanically locking the two casing halves 1 and 2 together. For instance, the joint between the two halves may be formed by interengaging projections 15 which are provided on each half of the casing and engage the gaps 16 between the projections, said gaps being of the same length as the projections, as in a dog clutch. Without additional aids these projections prevent relative rotation between the two casing halves. In this embodiment the two casing halves are also provided with a peripheral groove for the reception of a preferably detachable spring ring constituting the locking element. For manufacturing reasons it is preferred that the two casing halves 1 and 2 which are provided with the projections should have identical dimensions and shapes for complete interchangeability. To this end the dimensions and number of the projections 15 should be so chosen that when the casing halves have been fitted together opposite magnetic poles 3a in the stator annulus will be in opposed alignment.

A preferred embodiment of the casing halves with interengaging projections 15 and gaps 16 is illustrated in FIGS. 7 and 8. In this arrangement the radial thickness of a projection 15 is only half that of the casing halves 1 and 2. The zig-zag shaped joint formed by the projections 15 and the gaps 16 is then invisible from the outside and the closed casing is more effectively sealed against the ingress of dust. When the casing halves are separated the peripheral groove 17 is interrupted and appears only on the outside surfaces of the projections 15.

As will be understood from FIGS. 8 and 10 a narrow continuous peripheral land 18 is nevertheless formed in this embodiment near the edge of maximum diameter. A single split locking ring 19 may be inserted into the groove 17 as shown in FIGS. 9 and 10 or locking may be achieved by inserting a plurality of ring segments into the groove 17. In this embodiment, too, and as shown in FIG. 11, a ring 12 extending symmetrically from both sides of the joint may be inserted on the inside surface to comply with the explosion protection regulations and to ensure the maintenance of the required gap width. It will be readily understood that in view of the zig-zag shaped joint formed by the interengagement of the projections 15 and gaps 16 this ring 12 must be axially slightly wider than the corresponding ring 12 in the embodiment according to FIG. 6.

FIGS. 12a and 12b illustrate yet another method of securing locking ring 19 by means of a pin 21 which is here urged into engagement by a spring 20. Spring 20 and pin 21 are contained in a bore 22 which extends in the axial direction in at least one of the two casing halves 1 or 2.

FIG. 13 represents an embodiment in which several annuli of stator poles 3a are arranged in cascade, said poles cooperating with two intervening disc-shaped armatures 3. In such an arrangement an intermediate member 23 of the casing is interposed between the two parts 1 and 2, and the parting planes of the two joints coincide with the median radial planes of the armatures 3. The intermediate member contains a double annulus of stator poles 3a. The locking rings 5 in this embodiment may be designed according to any one of the above described embodiments without modification.

We claim:
1. A multipart casing for an electrical machine in which two adjacent parts of the casing are urged together by magnetic forces generated by active components of the machine, wherein each of said parts of the casing is provided in the region of their contacting surfaces with intermittent projections having half the thickness of the casing wall and being radially recessed from the contiguous portions of the outer face of said casing parts and thereby providing peripheral grooves in said projections, said grooves being parallel to said contacting surfaces and receiving a correspondingly shaped ring for mechanically holding said casing parts together, the outer face of said ring being substantially flush with respect to said contiguous portions.

2. A multipart casing for an electrical machine in which two adjacent parts of the casing are urged together by magnetic forces generated by active components of the machine, wherein each of said parts of the casing is provided in the region of their contacting surfaces with intermittent projections and peripheral grooves in said projections, said grooves being parallel to said contacting surfaces and adapted to receive a correspondingly shaped ring for mechanically holding said casing parts together, and an additional detachable ring seated in the interior of said casing parts, contiguous to the interior faces thereof, said additional ring having a depth sufficient to cover the joint between said parts and formed by said contacting surfaces and provide coverage of the gap width required for an explosion-proof construction of the machine casing.

3. A multipart casing as claimed in claim 1, in which said intermittent projections constitute circular segments forming arcs of equal lengths.

4. A multipart casing for an electrical machine in which two adjacent parts of the casing are urged together by magnetic forces generated by active components of the machine, wherein each of said parts of the casing is provided in the region of their contacting surfaces with intermittent projections and peripheral grooves in said projections, said grooves being parallel to said contacting surfaces and adapted to receive a correspondingly shaped ring for mechanically holding said casing parts together, and a seal between the contacting surfaces of said casing parts.

5. A multipart casing for an electrical machine in which two adjacent parts of the casing are urged together by magnetic forces generated by active components of the machine, wherein each of said parts of the casing is provided in the region of their contacting surfaces with intermittent projections and peripheral grooves in said projections, said grooves being parallel to said contacting surfaces and adapted to receive a correspondingly shaped ring for mechanically holding said casing parts together, and said projections provided on the casing parts and/or the cooperating parts of the locking ring having rising faces to generate a wedging effect.

6. A multipart casing for an electrical machine in which two adjacent parts of the casing are urged together by magnetic forces generated by active components of the ma-machine, wherein each of said parts of the casing is provided in the region of their contacting surfaces with intermittent projections and peripheral grooves in said projections, said grooves being parallel to said contacting surfaces and adapted to receive a correspondingly shaped ring for mechanically holding said casing parts together, and two or more dowel pins being inserted in the region of the contacting surfaces of the casing parts.

7. A multipart casing as claimed in claim 1, in which each of said casing parts is provided with projections separated by intervening gaps so that the projections of one casing part enter the gaps of the other casing part in the assembled state of the casing parts, said projections being provided with peripheral grooves.

8. A multipart casing as claimed in claim 7, in which said locking ring is insertable into said grooves.

9. A multipart casing for an electrical machine in which two adjacent parts of the casing are urged together by magnetic forces generated by active components of the machine, wherein each of said parts of the casing is provided in the region of their contacting surfaces with intermittent projections and peripheral grooves in said projections, said grooves being parallel to said contacting surfaces and adapted to receive a correspondingly shaped ring for mechanically holding said casing parts together, each of said casing parts being provided with projections separated by intervening gaps so that the projections of one casing part enter the gaps of the other casing part in the assembled state of the casing parts, said projections being provided with said peripheral grooves, said ring being insertable in said grooves, and at least one spring-loaded pin engageable with the locking ring.

References Cited

UNITED STATES PATENTS

| | | | |
|---|---|---|---|
| 1,856,514 | 9/1932 | Sheneman | 310—46 |
| 2,417,195 | 3/1947 | Hargreaves | 310—258 |
| 2,540,845 | 2/1951 | Thomas | 310—154 |
| 3,102,964 | 9/1963 | Bennett | 310—154 |
| 3,394,295 | 7/1968 | Cory | 310—46 |

MILTON O. HIRSHFIELD, Primary Examiner

R. SKUDY, Assistant Examiner

U.S. Cl. X.R.

310—258